UNITED STATES PATENT OFFICE.

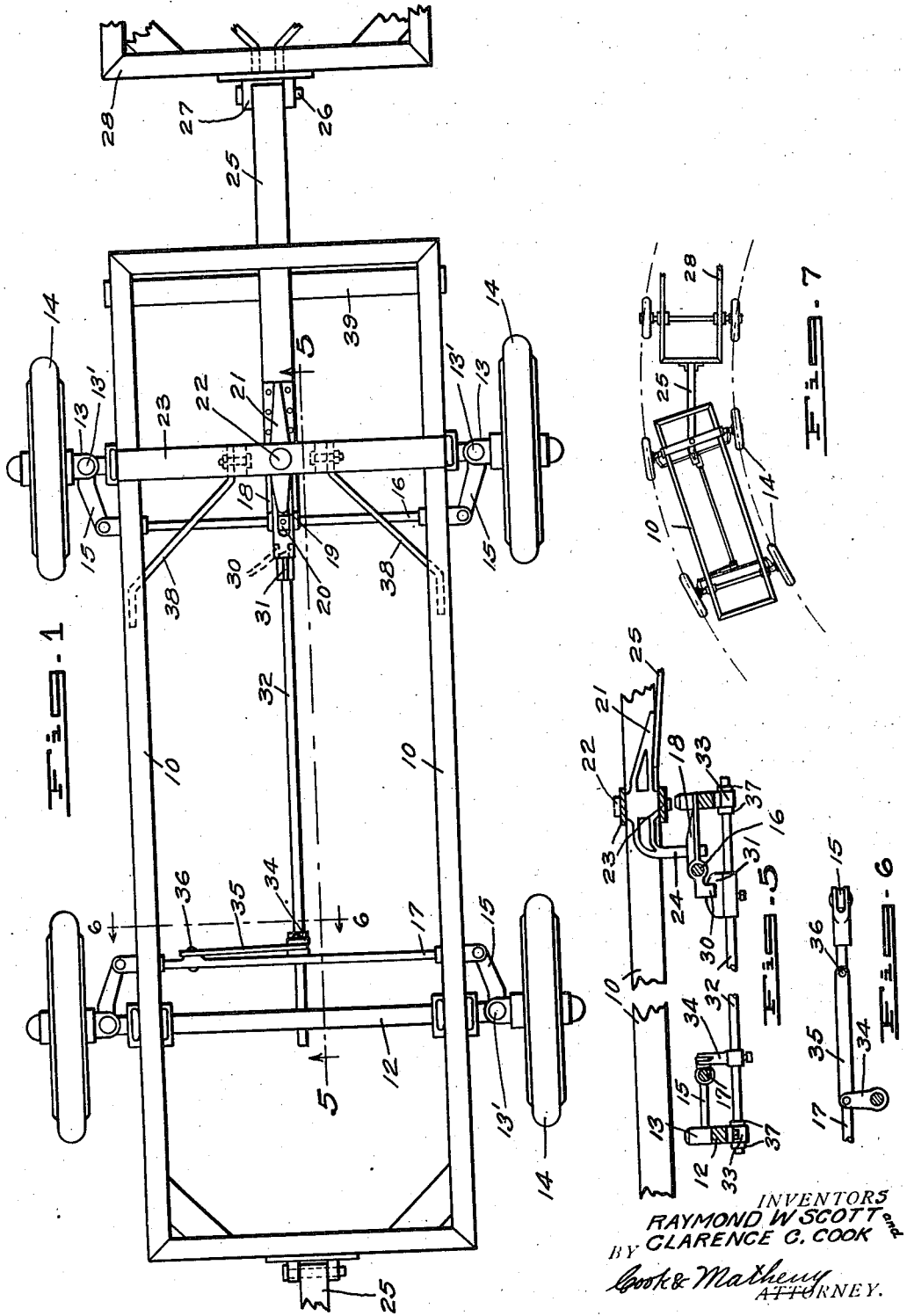

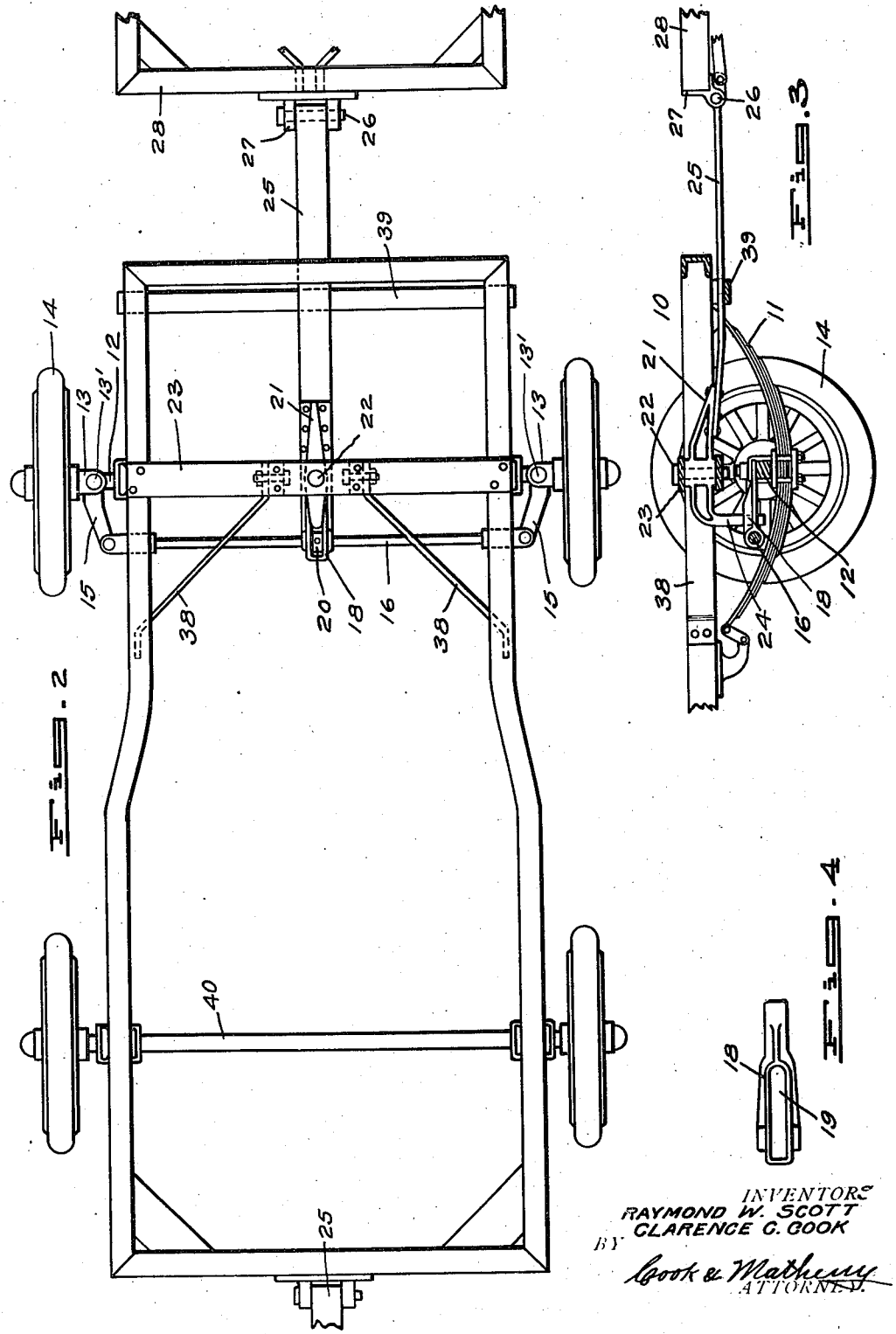

RAYMOND W. SCOTT AND CLARENCE C. COOK, OF SEATTLE, WASHINGTON.

GUIDING APPARATUS FOR VEHICLES.

1,276,422.   Specification of Letters Patent.   Patented Aug. 20, 1918.

Application filed November 27, 1916. Serial No. 133,805.

*To all whom it may concern:*

Be it known that we, RAYMOND W. SCOTT and CLARENCE C. COOK, citizens of the United States, residing at Seattle, in the county of King and State of Washington, have invented a new and useful Improvement in Guiding Apparatus for Vehicles, of which the following is a specification.

This invention relates to improvements in guiding apparatus for wheeled vehicles, and the object of this improvement is to provide simple and efficient means for guiding a trailer vehicle to cause it to follow substantially the same path that is taken by the vehicle to which the trailer is hitched.

The invention contemplates guiding apparatus for both the front and rear wheels of the trailer, and also contemplates the use of the guiding apparatus for the front wheels independently of the guiding apparatus for the rear wheels.

In vehicles of this class it is customary to hitch one or more trailers in tandem behind a source of power, as a motor truck, and when this is done it is necessary that the trailer wheels be guided in turning corners, particularly where more than one trailer is used, so that the trailers will follow the road or street in substantially the same path as the leading vehicle.

The invention resides in the novel construction of wheel-guiding devices and in the adaptation and combination of such devices with a trailer, as will be more clearly hereinafter described and claimed.

In the accompanying drawings, Figure 1 is a plan view of a trailer embodying this invention as it may appear when it is hitched to a leading vehicle; Fig. 2 is a similar plan view of the device when the steering apparatus for the rear wheels is omitted; Fig. 3 is a view in sectional elevation on broken line 3, 3 of Fig. 2; Fig. 4 is a plan view of a detail of the invention; Fig. 5 is a view in sectional elevation substantially on broken line 5, 5 of Fig. 1, certain parts being broken away; Fig. 6 is a detail view taken on line 6, 6 of Fig. 1; and Fig. 7 is a somewhat diagrammatic view of the trailer shown in Fig. 1 as it may appear when it is going around a curve.

Referring to the drawings throughout which like reference numerals indicate like parts, the numeral 10 indicates a trailer frame that is supported on springs, 11, secured to axles, 12. The ends of the axles, 12, are forked for the reception of steering knuckles, 13, that are mounted on vertical pivots, 13', and have spindles, not shown, upon which are mounted wheels, 14.

The steering knuckles, 13, are each provided with rigid steering knuckle arms, 15, of well known form, disposed at substantially right angles thereto. The arms, 15, that are associated with the front wheels of the trailer are connected with each other by a transverse steering rod, 16, and the arms, 15, that are associated with the rear wheels of the trailer are connected with each other by a similar steering rod, 17, in such a manner that when the steering rods 16 and 17 are moved crosswise of the trailer frame the wheels connected therewith are turned at an angle to the frame. (See Fig. 7.)

The steering apparatus for moving the front rod, 16, comprises a plate, 18, slotted as at 19, and having a transverse hole through which the steering rod extends, the plate being held in a central position on the rod by a lock ring, 20, in such manner that the forward end of the plate rests freely on the axle 12.

21 is an actuating arm pivoted as at 22 between two cross bars, 23, on the frame 10, and having a downturned element, 24, on the rear end thereof that projects through the slot 19 in the plate 18.

The forward end of the actuating arm 21 is rigidly secured to a draw bar, 25, that extends forwardly and is connected by a horizontal pivot, 26, with a bracket, 27, on the rear end of a truck frame, 28, in such manner that the draw bar will always project substantially straight to the rear of the truck frame, 28.

In operation, when the leading truck turns in either direction the draw bar 25 will be turned about the pivot 22 into an angular position, and the steering rod will be moved crosswise of the car by engagement of the member 24 within the slot 19, thus turning the front wheels into an angular position with respect to the frame as shown in Fig. 7.

The rear end of the plate 18 is provided with downturned spaced fingers, 30, that straddle an upwardly projecting fin member, 31, rigidly secured on a shaft, 32, that is journaled in suitable bearings, 33, and extends rearwardly of the truck frame, 10. At a point near the steering rod, 17, the shaft 32 is provided with a rigidly secured, upwardly projecting arm, 34, (see Figs. 5 and 6) to the top end of which is pivoted a link, 35, that is articulated by a pivot, 36, with the steering rod, 17, in such manner that when the shaft, 32, is rotated the steering rod, 17, will be moved crosswise of the frame, 10, and the rear wheels of the trailer will be turned at an angle with respect to the frame.

It is thus seen that when the draw bar, 25, is turned on the pivot, 22, the front and rear wheels respectively will be caused to steer in unison in opposite directions, as indicated in Fig. 7.

The shaft, 32, at points adjacent to the bearings, 33, is provided with lock rings, 37, to prevent endwise movement thereof.

38 are angular braces extending from the sides of the frame to points near the center of the cross bars, 23, to strengthen the structure adjacent to the pivot 22.

39 is a cross bar on the front end of the trailer frame to support the draw bar, 25, and prevent undue strain on the pivot, 22.

It will be noted that the member 24 projects through the slot 19 sufficiently far to insure that it will not be displaced from said slot by relative movement between the frame, 10, and axle, 11, when the trailer passes over uneven or rough roads.

The trailer illustrated in Fig. 2 is substantially identical with the trailer shown in Fig. 1, except that the rear wheels thereof are mounted on a rigid axle, 40, and the steering devices for such rear wheels are dispensed with, thus providing a trailer vehicle of which only the front wheels are steered by the leading vehicle.

It will be noted that the trailer shown in Fig. 2 and the front portion of the trailer shown in Fig. 1 present substantially the same appearance with respect to frame, wheels, and steering apparatus as the chassis of a well known type of motor vehicle, this invention residing in the actuating mechanism for the steering devices.

Obviously changes in minor details and form of construction of the various parts of this device may be resorted to within the scope of the appended claims.

What we claim and desire to protect by Letters Patent is:

1. The combination, with a vehicle frame having a front axle, of steering knuckles pivoted on the ends of said axle, said knuckles having spindles thereon, wheels on said spindles, steering knuckle arms rigid on said steering knuckles and extending rearwardly therefrom, a steering rod connecting said arms, a plate secured at one end to said steering rod and adapted to have its other end rest upon said axle, said plate having a longitudinal slot, a cross bar on said frame adjacent to and in front of said steering rod, a draw bar pivoted to said cross bar to project forwardly of said frame and be secured to a leading vehicle, and a downturned element on the rear end of said draw bar to engage within said slot in said plate and move said steering rod when said draw bar is turned on its pivot.

2. The combination, with a vehicle frame, having wheels mounted by knuckle joints on the front and rear axles thereof, of steering arms on said knuckle joints, transverse steering rods connecting the front steering arms and rear steering arms respectively, a slotted plate on said front steering rod, a pivoted draw bar adapted to be connected with a leading vehicle, means on the rear end of said draw bar for engaging within said slotted plate to move said steering rod when said draw bar is turned on its pivot, a rotatable shaft, an arm fixedly secured to the rear end of said shaft, a link connecting the end of said arm with said rear steering rod, a fixedly secured fin on said shaft and devices on said slotted plate engageable with said fin to rotate said shaft when said front steering rod is moved crosswise of said frame.

In testimony whereof we affix our signatures in the presence of two witnesses this 11th day of October, 1916.

RAYMOND W. SCOTT.
CLARENCE C. COOK.

Witnesses:
ERNEST B. HERALD,
F. C. MATHENY.